UNITED STATES PATENT OFFICE.

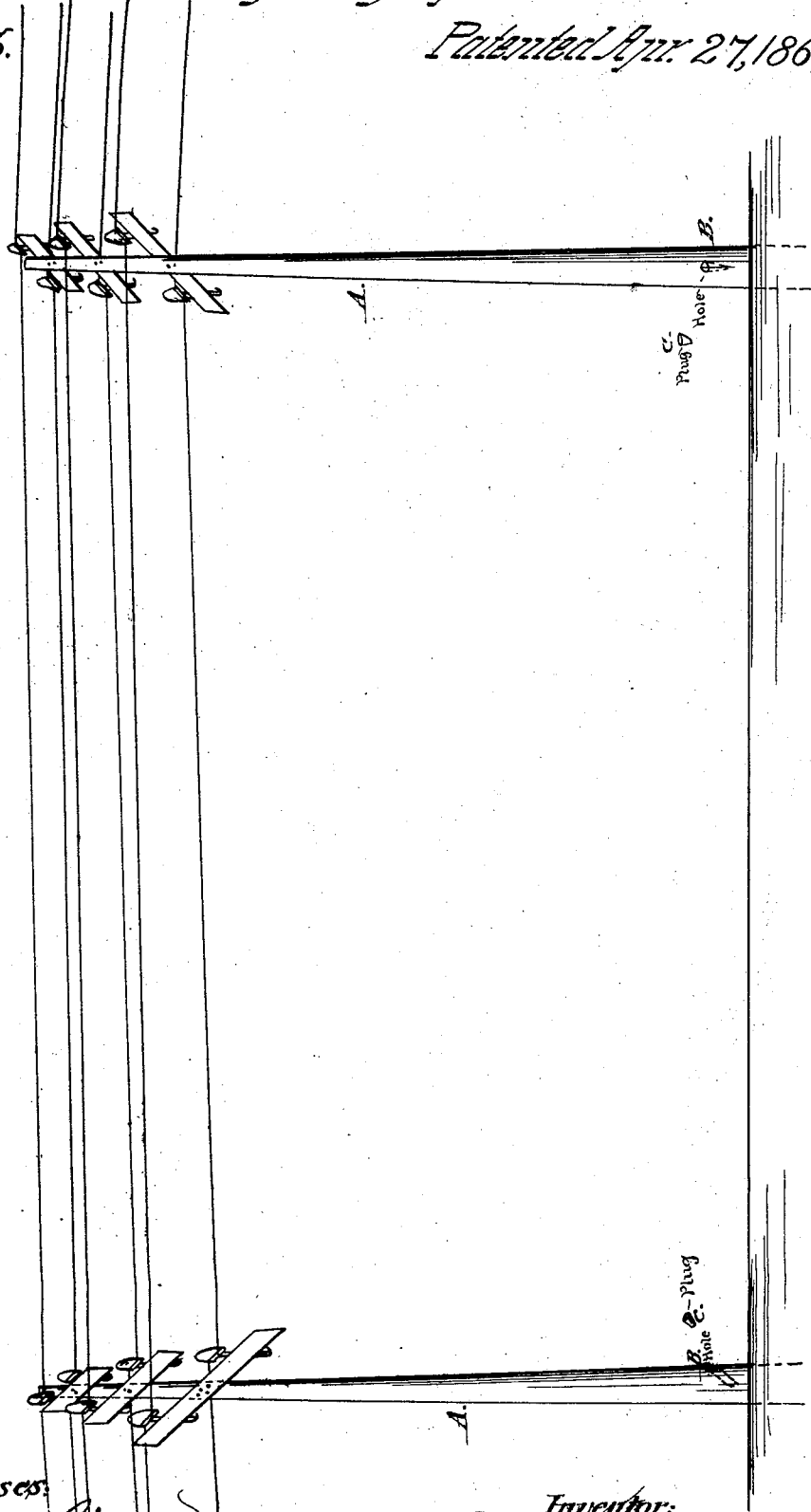

LOUIS S. ROBBINS, OF NEW YORK, N. Y.

IMPROVED MODE OF PRESERVING TELEGRAPH-POLES.

Specification forming part of Letters Patent No. 89,345, dated April 27, 1869.

*To all whom it may concern:*

Be it known that I, LOUIS S. ROBBINS, of the city, county, and State of New York, have invented a new and Improved Process for Preserving Telegraph-Poles from Mold and Decay; and I do hereby declare that the following is a clear and exact description thereof, which will enable those skilled in the art to use and practice the same, reference being had to the accompanying drawings, forming a part of this specification.

It is well known that telegraph-poles, when set up for use, rapidly decay at or near the surface of the ground, while the upper part and that portion embedded in the soil will last for many years longer.

To prevent the decay of the telegraph-pole at or near the ground is the object of the present invention, and this object is accomplished thereby.

The method consists in impregnating the pole with an antiseptic and preservative material which will close the pores and form such a combination with the fiber of the wood as will effectually prevent the deteriorating effects of either heat or moisture at ordinary temperatures.

In carrying out my present invention I first bore a hole or holes, as represented in the accompanying drawing.

A A represent the telegraph-poles; B B, the holes, which are made with an auger or any other suitable instrument, commencing about fifteen inches above the ground, and inclined at an angle of forty-five degrees, extending two-thirds through the diameter of the pole; C C, the plug to be inserted in the hole B B when filled with the preservative material. The hole or holes may be larger or smaller, according to the size of the pole which is to be treated. After the hole (or holes) has (or have) been prepared, it (or they) is (or are) then filled from a can or other vessel having a feeding-spout with what is known as "creosote-oil," which is obtained by a distillation of coal-tar at a trifling expense, after which the plug C C is inserted, which excludes the air and moisture from the orifice. The hole or holes may be refilled at any time, if it should be thought necessary. The same material may be also applied to the surface of the pole just above the ground by means of a brush or any other suitable appliance at the time the hole (or holes) is (or are) filled.

By this means I am enabled without disturbing the poles to saturate them and preserve them at or near the surface of the ground in a rapid and economical manner.

What I claim as my invention, and desire to secure by Letters Patent, is—

The process of impregnating the lower portion of telegraph-poles with creosote-oil, substantially as herein described.

LOUIS S. ROBBINS.

Witnesses:
NATHANIEL GILL,
M. AHEARNE, Jr.